Figure 1:
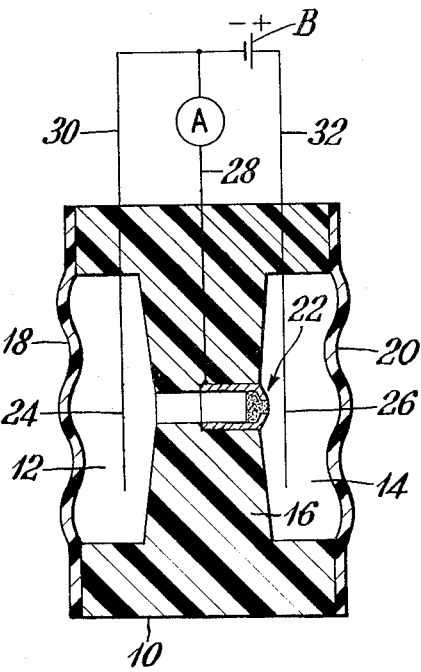

Dec. 27, 1966   N. N. ESTES ETAL   3,295,027
ELECTROCHEMICAL LINEAR DETECTOR AND POROUS ELECTRODE THEREFOR
Filed Nov. 29, 1963

Tantalum Carbide — Tantalum Oxide
Tantalum Metal

INVENTORS
NELSON N. ESTES
GEORGE T. KEMP
BY John R. Haherty
ATTORNEY

United States Patent Office 3,295,027
Patented Dec. 27, 1966

3,295,027
ELECTROCHEMICAL LINEAR DETECTOR AND
POROUS ELECTRODE THEREFOR
Nelson N. Estes and George T. Kemp, Austin, Tex., assignors to Union Carbide Corporation, a corporation of New York
Filed Nov. 29, 1963, Ser. No. 326,902
10 Claims. (Cl. 317—230)

This invention relates to electrodes for use in electrochemical linear detector units.

The basic principles of electrochemical detectors are described in a paper by Hurd and Lane, "Principles of Very Low Power Electrochemical Control Devices," Journal of the Electrochemical Society, volume 104, No. 12, December, 1951. One type of detector has the property that the electric current (or the voltage across a series resistance) in an external biasing circuit is directly proportional to the volume flow rate of fluid through a detecting element. This type is called an electrochemical linear detector. It is used for measuring physical signals, such as acoustical pressure.

Generally, detectors of this type comprise a housing divided into two compartments, one wall of each compartment having a flexible diaphragm therein. Each of the compartments contains a solution of an electrolyte comprising a reversible redox system, and in each compartment is an electrode, one electrode being an anode and the other a cathode. Mounted between the compartments is a partition having a small aperture therein and in juxtaposition with an aperture is a detecting electrode which is usually made the cathode in an external biasing circuit.

When a voltage is applied across the electrodes in the compartments of a detector utilizing an electrolyte in the iodine-iodide system, for instance, iodine becomes concentrated in the anode compartment and virtually depleted in the cathode compartment. If fluid flows from the iodine-rich compartment to the iodine-poor compartment, an electrical signal is produced at the detecting cathode. This signal is directly proportional to the magnitude of the flow. A flow of fluid may be caused, for instance, by the application of a pressure on the diaphragm in the anode compartment.

Previous detectors have used a detecting electrode of the so-called strip electrode type. It comprises a flat strip of platinum disposed between two flat-faced pieces of fritted or porous glass which are so arranged as to provide a thin corridor along both sides of the electrode strip. Generally, this type of electrode will exhibit good frequency response with a reasonable pressure threshold. However, the dynamic range of the electrode is somewhat narrow because the dimensions of the corridors must be kept very thin and short in order to attain the desired frequency response and pressure threshold.

It is the primary object of the invention to provide an electrochemical detector that is capable of operation under a wide variety of conditions. More specifically, another object is to provide a detecting electrode that is characterized by the combination of good frequency response, pressure threshold and linearity over a wide dynamic range.

Figure 2:
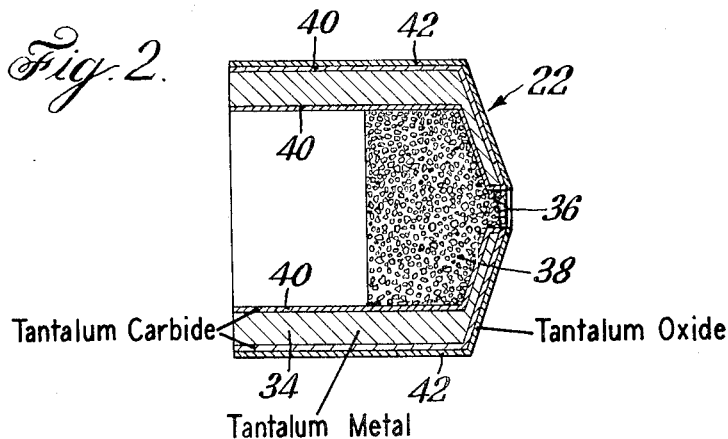

The above and other related objects are achieved by the invention which will be described with reference to the accompanying drawing, wherein:

FIGURE 1 is a vertical section of an electrochemical detector embodying the invention; and FIGURE 2 is a greatly enlarged, sectional view of the detecting cathode used in the detector of FIGURE 1.

In accordance with the invention, an electrode for an electrochemical detector is provided comprising a hollow support structure forming a small orifice at one end thereof and having an insulating outer surface, and disposed within the hollow support structure in close proximity to the orifice, a porous mass of an electrically conductive inert material.

Suitable materials for the porous mass in the electrode of the invention include the carbides, nitrides, silicides and borides of the transition metals of Groups IV–B, V–B and VI–B of the Periodic Table, disclosed in the copending U.S. application of Robert A. Powers et al., Serial No. 324,275, filed on November 18, 1963. These transition metal compounds possess an excellent electrical conductivity and are virtually completely inert to an electrolyte solution of a reversible redox system.. The transition metals of Groups IV–B, V–B and VI–B are hafnium, titanium, zirconium, niobium, tantalum, vanadium, chromium, molybdenum and tungsten. Of the transition metal compounds, the carbides, nitrides, silicides and borides of tantalum, zirconium, niobium and hafnium are preferred. Among these compounds, tantalum carbide is preferred. Illustrative of suitable compounds for the electrode of the invention are the following:

| Carbides | Nitrides | Silicides | Borides |
|---|---|---|---|
| TaC | TiN | $TaSi_2$ | $TiB_2$ |
| NbC | ZrN | $TiSi_2$ | TiB |
| $Mo_2C$ | NbN | $ZrSi_2$ | $ZrB_2$ |
| $W_2C$ | $Nb_2N$ | $Cr_3Si_2$ | ZrB |
| WC | TaN | | $NbB_2$ |
| ZrC | CrN | | NbB |
| VC | | | $Mo_2B$ |
| HfC | | | $\alpha MoB$ |
| TiC | | | $\beta MoB$ |
| $Cr_3C_2$ | | | $Mo_2B_5$ |
| | | | $MoB_2$ |
| | | | CrB |

The porous mass in the electrode of the invention may be prepared from fine particles or granules of the transition metal. Generally, the particles should be as nearly spherical as possible and may be of a size of from about 0.003 to 0.010 inch in diameter. The particles are shaped into the desired configuration and may be molded under high pressure within the hollow support structure. The particles are then sintered at elevated temperatures and converted to the transition metal compound by well known techniques. It will be understood, of course, that only the surface portions of the sintered particles may be, and preferably are, composed of the carbide, nitride, silicide or boride of the transition metal.

In a preferred embodiment of the invention, the hollow support structure is conical in shape and has a small orifice provided at its apex end. The structure should be inert to the electrolyte solution and may be composed of any one of the transition metal compounds mentioned above, and preferably is of tantalum carbide. The outer surface of the structure is provided with an insulating coating, for instance, an oxide of the transition metal.

Referring now to the drawing, an electrochemical detector embodying the invention comprises a housing 10 divided into two compartments 12, 14 by a partition 16, each of the compartments having as one wall thereof one of a pair of flexible diaphragms 18, 20. The partition 16 has a central aperture in which is mounted the detecting cathode of the invention as generally indicated at 22. The compartments are filled with an electrolyte of a solution of a reversible redox system, for instance, potassium iodide-iodine, and in each of the compartments is one of a pair of electrodes 24, 26. The electrodes 24, 26 may be composed of one of the transition metal compounds, e.g., a tantalum carbide wire. The detecting cathode 22 is connected through a suitable lead 28 into a biasing circuit including an ammeter A and a biasing battery B. Both electrodes 24, 26 are connected through leads 30, 32 across the battery B in a manner whereby the electrode 24 is the cathode and the electrode 26 is the anode.

As illustrated in FIGURE 2, the detecting cathode of the invention comprises a generally cylindrical, hollow shell 34 having a conically shaped end, the apex of which terminates in a small orifice 36. The porous, electrically conductive, inert mass 38, e.g., tantalum carbide, partially fills the hollow shell 34 and lies flush with the plane of the orifice 36. The hollow shell 34 is inert to the electrolyte solution and may be composed of one of the transition metals and a surface layer 40 of the carbide, nitride, silicide or boride of the metal. Desirably, the surface layer 40 and porous mass 38 are of the same material, for instance, tantalum carbide. The outer surface of the hollow shell 34 is provided with an insulating coating 42, suitably an oxide of the transition metal.

The operation of the detector of the invention will be described with reference to the use of an electrolyte in the iodine-iodide system for the sake of conciseness, although as will be pointed out below, other reversible redox systems may be used as the electrolyte. In the iodine-iodide system, iodine dissolved in an aqueous solution of potassium iodide exists predominantly as the tri-iodine ion, $I_3^-$.

When a current is passed across the electrodes 24, 26, iodine is concentrated at the anode electrode 26 and is depleted at the cathode electrode 24 in accordance with the following equations:

$$\text{Cathode: } I_3^- + 2e \rightarrow 3I^-$$
$$\text{Anode: } 3I^- - 2e \rightarrow I_3^-$$

Thus a concentration of iodine is produced in the compartment 14 containing the anode electrode 26 while the iodine content in the compartment 12 containing the cathode electrode 24 is depleted. Due to the difference in iodine concentration existing in the two compartments, there is a tendency for diffusion of iodine from the iodine-rich compartment 14 to the iodine-poor compartment 12 through the detecting cathode 22. This diffusion causes the detecting cathode 22 to produce a signal indicated on the ammeter, but this signal remains substantially constant. Any increase in fluid flow through the detecting cathode 22 (i.e., through the orifice 36 and porous mass 38) caused, for instance, by the application of pressure on the diaphragm 20 of the anode compartment 14 will cause a proportional increase in the signal produced by the detecting cathode 22. This increase is then indicated on the ammeter A.

With the detecting electrode described above, the porous mass 38 provides relatively small width dimensions in the electrolyte solution throughout the electrode structure while at the same time permitting an area expansion of the solution after it passes through the orifice 36. Thus, a particular time constant of iodine reduction can be maintained and good linearity for a wide dynamic range can be accomplished without a significant change in the pressure threshold. Furthermore, since the porous mass 38 is disposed flush with the orifice 36, good frequency response is obtained.

In the preferred electrode structure illustrated in FIGURE 2, the analogous acoustic resistance (defined as the ratio of pressure across the device to the volume flow through it) is concentrated primarily in the orifice 36. Additionally, the conical configuration of the electrode allows free circulation of iodine solution around the outside of the orifice 36. Due to the lower density of dilute solution in the $I_2$–KI system, this solution, which emerges from the electrode, might otherwise become trapped at or near the orifice 36 and the result would be reduced sensitivity.

To illustrate the practice of the invention, a detecting cathode was made in the following manner:

A cylindrical shell of tantalum metal having an inside diameter of about 0.094 inch and having a conical shaped end terminating in a small aperture of approximately 0.020 inch in diameter was prepared. Tantalum metal powder was then screened to an approximate particle size of 0.004 inch in diameter and was ball milled with 1.0% by weight of stearic acid which served as both a lubricant and adherent during the forming process. The particles were again screened to the proper size and then pressed into the cylindrical shell under a pressure of about 60,000 p.s.i.

The tantalum metal shell and compressed particles were carbonized as follows: The shell was placed in a furnace equipped with a high vacuum pump and the tantalum particles were sintered for 30 minutes at a temperature of between 2300 to 2400° C. in a clean vacuum of less than $5 \times 10^{-5}$ mm. Hg. The temperature of the furnace was then reduced to about 1600° C. and a gaseous mixture (1:5 mixture) of ethylene and hydrogen was inserted into the furnace at a gas pressure of about 3 or 4 mm. Hg. The temperature was maintained for about 1 hour and the furnace was then fore-pumped for 5 minutes and the high vacuum pump was turned on again. When the gas pressure reached $5 \times 10^{-5}$ mm. Hg, the temperature was raised slowly to 2000° C. not allowing the pressure to exceed $5 \times 10^{-5}$ mm. Hg. The temperature was held for 15 minutes and then reduced back to 1600° C. Again, a gaseous mixture of 1:5 ethylene and hydrogen was inserted into the furnace at about 3 or 4 mm. Hg and the temperature maintained for 1 hour. Thereafter, the furnace was fore-pumped and the temperature reduced to about 600° C. in about 15 seconds. After 5 minutes, the high vacuum pump was turned on and allowed to pump for at least 15 minutes, after which heating was discontinued. The furnace was then allowed to cool for at least 20 minutes with the high vacuum pump left on. The pump was then turned off and the shell removed.

Surface insulation of the cylindrical shell was accomplished by selective oxidation of the outer surface only. The interior of the shell, including the porous mass, was protected from oxidation by flowing argon throughout the electrode structure while it was being heated by induction. The outer tantalum carbide surface was then oxidized by heating to about 950° C. while surrounded by normal room air.

A number of electrochemical detectors utilizing detecting cathodes formed as described above and electrolyte solutions of the $I_2$–KI system have been made and tested. These detectors exhibited good frequency response, pressure threshold and linearity over a dynamic range far in excess of prior devices using electrodes of the so-called electrode strip type.

It will be appreciated that a number of different materials may be used in the detector of the invention. For instance, any reversible redox system may be used for the electrolyte as indicated above. In addition to the iodine-iodide system, the ferrocyanide-ferricyanide and cerous-ceric systems are suitable. The electrolyte is dissolved in a solvent; the requirements of which are that it dissolve the measured species of the redox system and permit one of the species to become ionized. Suitable solvents are water and alcohols, particularly methyl and ethyl, or alcohol-water mixtures, preferably a methyl alcohol-water mixture.

Electrodes for use in the compartments of the detector should be inert to the electrolyte solution and may be composed of the same transition metal compound as used in the cathode structure ( e.g., tantalum carbide). In addition, some noble metals may be used, for instance, platinum, if desired.

The housing and diaphragms of the detector are suitably composed of an inert plastic material. Depending upon the electrolyte solution used, nylon, polyethylene, polymethylmethacrylate and vinylidene plastics may be used; however, the preferred plastics are polytrifluorochloroethylene and polytetrafluoroethylene.

The detecting electrode of the invention may employ an electrically non-conductive support structure if desired; for instance, the cylindrical shell described herein may also be made of an inert plastic material. In this case, a preformed sintered plug, previously converted to the carbide, nitride, silicide or boride, is pressed into the plastic shell and on electrical connection made thereto.

It will be understood that the detecting electrode of the invention is not limited to use solely in the linear detector unit described herein, and that the electrode is suitable for use in other types of detectors and similar devices. For instance, the detecting electrode may be used in a detector of the so-called "double cathode" type in which two cathodes are positioned in the apertured partition in order to measure the flow of solution in either direction through the compartments of the detector.

A standard Periodic Table is described in "Handbook of Chemistry" by Lange, 9th Edition, published 1956, pages 56 and 57, and is to be referred to in the classification of the transition metals which may be used in the practice of the invention.

We claim:

1. An electrode for a linear detector comprising an inert, hollow shell defining an open passageway along the axis thereof and having an insulating outer surface, and a porous, inert, electrically conductive mass disposed within said shell and across a whole cross-section of said passageway, said porous mass being composed of a material selected from the group consisting of the carbides, nitrides, silicides and borides of a transition metal selected from the group consisting of hafnium, titanium, zirconium, niobium, tantalum, vanadium, chromium, molybdenum and tungsten.

2. An electrode in accordance with claim 1 wherein said elongated, hollow shell is composed of an inert plastic material.

3. An electrode in accordance with claim 1 wherein said hollow shell is composed of a material selected from the group consisting of the carbides, nitrides, silicides and borides of a transition metal selected from the group consisting of hafnium, titanium, zirconium, niobium, tantalum, vanadium, chromium, molybdenum and tungsten, and wherein said insulating outer surface is composed of an oxide of a transition metal selected from the group of said metals.

4. An electrode in accordance with claim 1 wherein said porous mass is composed of sintered particles of a transition metal selected from the group consisting of hafnium, titanium, zirconium, niobium, tantalum, vanadium, chromium, molybdenum and tungsten, and wherein the surface portions of said sintered particles are composed of a material selected from the group consisting of the carbides, nitrides, silicides and borides of a transition metal selected from the group of said metals.

5. An electrode in accordance with claim 4 wherein said hollow shell is composed of a transition metal selected from the group consisting of hafnium, titanium, zirconium, niobium, tantalum, vanadium, chromium, molybdenum and tungsten and a surface layer of a material selected from the group consisting of the carbides, nitrides, silicides and borides of a transition metal selected from the group of said metals, and wherein said insulating outer surface is composed of an oxide of said transition metal selected from the group of said metals.

6. An electrode for a linear detector comprising an elongated, hollow shell having an insulating outer surface and a conically shaped end terminating in an orifice, and a porous, inert, electrically conductive mass disposed within said shell and across a whole area of said orifice, said porous mass and the inner surface of said shell being composed of a material selected from the group consisting of the carbides, nitrides, silicides and borides of a transition metal selected from the group consisting of hafnium, titanium, zirconium, niobium, tantalum, vanadium, chromium, molybdenum and tungsten, and said insulating outer surface of said shell being composed of an oxide of a transition metal selected from the group of said metals.

7. An electrode in accordance with claim 6 wherein said porous mass is composed of sintered tantalum metal particles, the outer surface portions of which are composed of tantalum carbide.

8. An electrode in accordance with claim 7 wherein said hollow shell is composed of tantalum metal and a surface layer of tantalum carbide, and wherein said insulating outer surface is composed of tantalum oxide.

9. In an electrochemical linear detector comprising a housing divided into a pair of compartments by an apertured partition, one wall of each of said compartments having a flexible diaphragm therein, and an electrode and an electrolyte solution of a reversible redox system in each of said compartments; a detecting element mounted in the aperture of said partition and comprising a hollow shell composed of a material inert to said electrolyte solution and defining an open passageway along the axis thereof and having an insulating outer surface, and a porous, inert, electrically conductive mass disposed within said shell and across a whole cross-section of said passageway, said porous mass being composed of a material selected from the group consisting of the carbides, nitrides, silicides and borides of a transition metal selected from the group consisting of hafnium, titanium, zirconium, niobium, tantalum, vanadium, chromium, molybdenum and tungsten.

10. An electrochemical linear detector in accordance with claim 9 wherein the electrode in each of said compartments is composed of a material selected from the group consisting of platinum and the carbides, nitrides, silicides and borides of a transition metal selected from the group consisting of hafnium, titanium, zirconium, niobium, tantalum, vanadium, chromium, molybdenum and tungsten.

No references cited.

JOHN W. HUCKERT, *Primary Examiner.*

J. D. KALLAM, *Assistant Examiner.*